March 6, 1951  G. W. PONTIUS, III  2,544,042
HYDRAULIC POWER BRAKE SERVO MECHANISM
Filed June 9, 1945  2 Sheets-Sheet 1
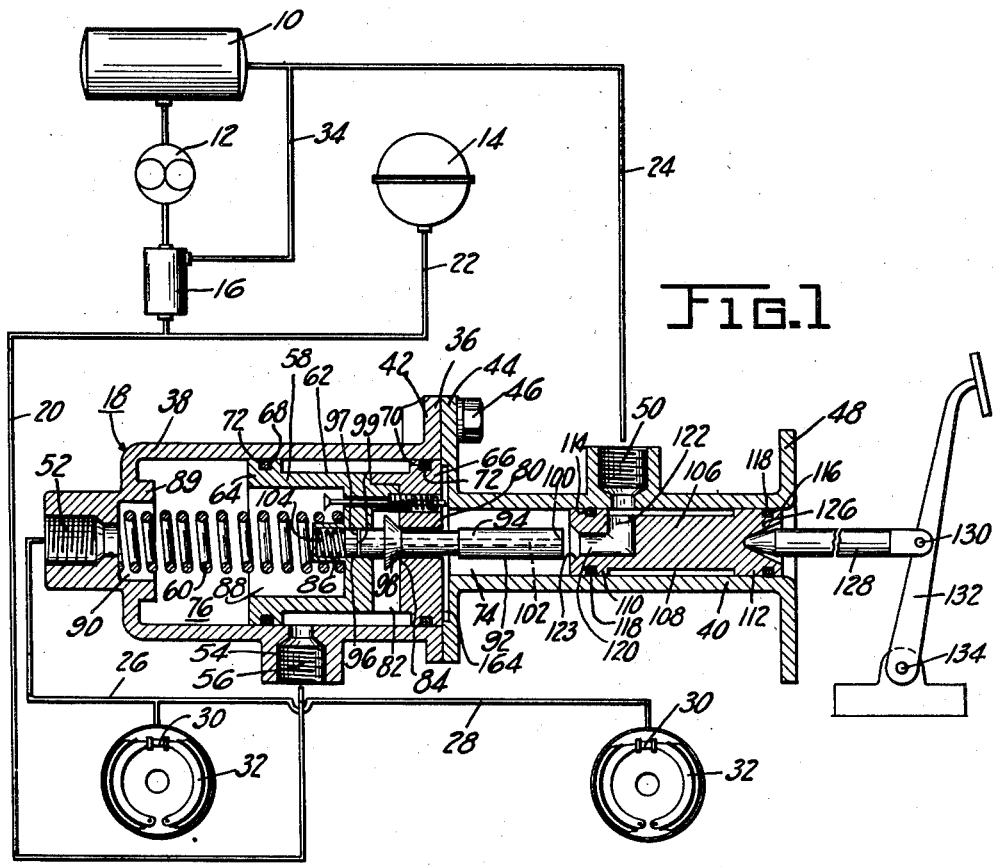
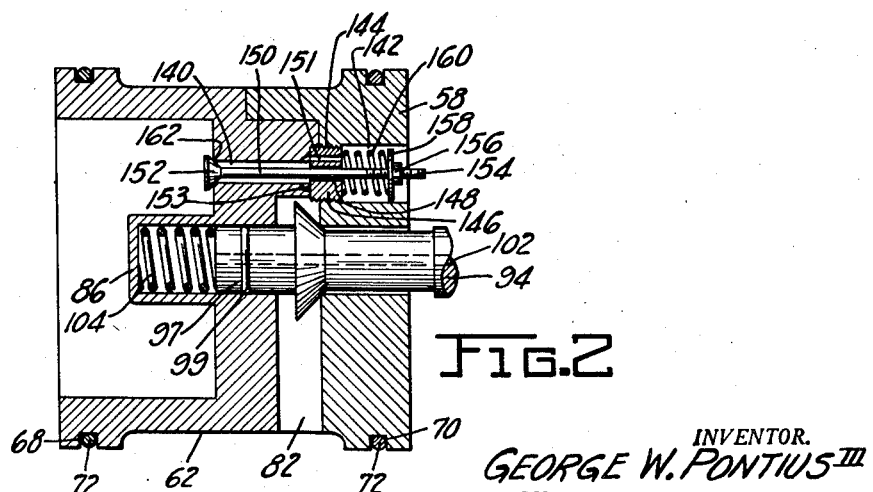
INVENTOR.
GEORGE W. PONTIUS III
BY Cecil D. Arens
ATTORNEY

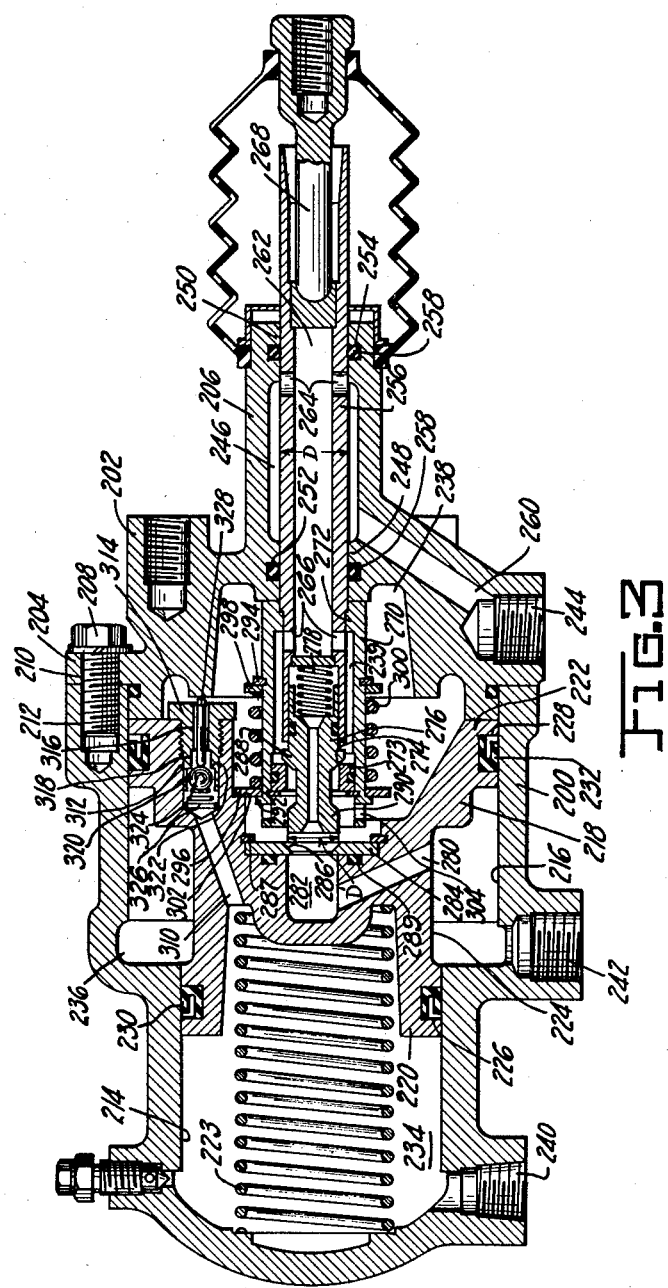

Patented Mar. 6, 1951

2,544,042

UNITED STATES PATENT OFFICE 2,544,042

HYDRAULIC POWER BRAKE SERVO MECHANISM

George W. Pontius, III, South Bend, Ind., assignor to Bendix Aviation Corporation, South Bend, Ind., a corporation of Delaware Application June 9, 1945, Serial No. 598,491

3 Claims. (Cl. 60—54.6)

This invention relates to a liquid pressure servo-mechanism of the type which may be used in hydraulic braking systems but not necessarily limited thereto.

An important object of the invention resides in the provision of a fluid power unit incorporating a follow-up balanced valve means, controlled by an operator, for varying the fluid pressure admitted to one end of the power unit, whereby fluid in the other end is put under a unit pressure greater than the unit pressure in said one end of the fluid power unit.

A still further object of the invention is to provide an operator operated hydraulic power unit having a movable piston therein and a sleeve member mounting hydraulically balanced valve means controlled by the operator for admitting fluid to the unit to thereby control movement of said piston.

Another important object of the invention resides in the provision of means for use with a servo-mechanism of a hydraulic system comprising a power source and a closed fluid system, for connecting said closed system to the hydraulic power source when said servo mechanism is in normal position to compensate for any change in volume of fluid in the said closed system due to temperature variations.

Still further objects and details of the invention will be apparent from the description hereinafter disclosed and the accompanying drawings illustrating the invention by way of example.

In the drawings:

Figure 1 is a diagrammatic illustration partly in section of a hydraulic system comprising a servo-mechanism according to the invention;

Figure 2 is an enlarged longitudinal section of the piston of the servo-mechanism showing the make-up valve in closed position; and Figure 3 shows a longitudinal section of a modification of the servo-mechanism.

Referring now to Figure 1, the numeral 10 indicates a reservoir to which is connected a pump 12 which receives fluid from the reservoir and puts the same under pressure in an accumulator 14 which is connected to the pump through a regulating or unloading valve 16, of any conventional design. A hydraulic power unit or servo mechanism 18 is connected to the unloading valve 16 and accumulator 14 through pipes 20 and 22. A pipe 24 connects the servo mechanism to the reservoir 10, and pipes 26 and 28 connect the mechanism with motors 30 of brakes 32. A conduit 34 connects the unloading valve 16 to pipe 24 which joins the reservoir to by-pass fluid thereto when the accumulator pressure has reached a predetermined value dependent upon the setting of the unloading valve 16. Since the unloading valve per se forms no part of this invention its details of construction and operation are deemed unnecessary in the present specification.

The servo-mechanism 18 comprises a cylinder 36 which in the instant case is formed of two axially displaced casings 38 and 40, having flanged portions 42 and 44 respectively, constructed and arranged to receive bolts 46 which securely hold the casings in fixed relationship. The casing 40, which forms one end of the cylinder 36, has a flange 48 integral therewith and constituted to be fastened to some part of a vehicle, not shown, with which the servo-mechanism is associated. An outlet port 50 is formed in the casing 40 of the cylinder and is connected to the pipe 24 which communicates with the reservoir. A working port 52 is disposed in the casing 38 at the other end of the cylinder and is constructed and arranged to receive the pipe 26 to communicate said other end of the cylinder with the motors 30 of brakes 32. Also formed in the casing 38 is an inlet port 54 threaded at 56 to receive the pipe 20 which supplies fluid under pressure from the accumulator 14 to the cylinder 36.

Reciprocally contained within the cylinder 38 of the servo-mechanism is a piston 58 normally urged toward one end of the cylinder by a spring 60. The piston 58 has a circumferential groove 62 extending axially along the piston between lands 64 and 66 each of which has an annulus 68 and 70 formed therein respectively to receive seals 72 intended to isolate the inlet pressure in groove 62 from chamber 74 in one end of the cylinder and chamber 76 in the other end of the cylinder. Piston 58 is bored longitudinally at 80 to intersect a chamber 82 which is in continuous communication with the inlet 56 through the circumferential groove 62. This circumferential groove permits chamber 82 to be subjected to inlet pressure at all times irrespective of the position of the piston in the cylinder. A valve seat 84 is formed at the intersection of the bore 80 with the chamber 82. A boss 86 formed in the cut-out portion 88 of the piston provides means for retaining one end of the spring 60 in place against the piston. The other end of the spring is retained in a boss 89 counterbored at 90. The boss 89 also provides a stop for piston 58 when it is moved to the left end of the cylinder.

For controlling the inlet pressure to chamber 74 in one end of the cylinder, means carried by the piston is provided. Said means comprising a valve 92 reciprocably disposed in the bore 80 and normally urged against the valve seat 84. The valve 92 includes a stem 94 of the same diameter as bore 80, an extension 96 of the stem having a diameter the same as bore 80 to form a bearing fit therewith, and a frusto-conical valve head 98 and a valve head 100, the former of the valve heads being arranged to engage valve seat 84. A longitudinal passage 102 connects the ends of the valve 92 to permit the same pressure to act on the ends of the valve whether opened or closed. The bore 80 extends into the boss 86 to form a chamber in one end of the bore for the reception of a spring 104 which abuts one end of the valve 92 to normally urge the frusto-conical head 98 onto seat 84. An annulus 97 in the stem extension 96 is constituted to receive a seal 99 to divorce chamber 82 from the end of bore 80 in which spring 86 is disposed.

Since that part of the system connected to the working port 52 and including chamber 76, pipes 26 and 28, and motors 30 is a closed hydraulic system, means must be provided to compensate for any change in volume of fluid in that part of the system due to temperature variations of the fluid. This type of system must be protected against expanding fluids due to rising temperatures and against shrinking fluids due to decreasing temperatures, the latter of which will have a tendency to form a vacuum in the system. Referring to Figure 2, the means employed for meeting these conditions include a valve mechanism which comprises passages 140 and 142 drilled in piston 58 to connect chamber 74 to chamber 76. Passage 142 is interiorly threaded at 144 to receive a bushing 146 drilled at 148 to the proper size to permit a valve stem 150 to slide therein. The bushing is drilled at 151 to connect passage 140 to passage 142. Passage 142 is countersunk at 153 to preclude the closing of passage 151 when the bushing 146 is bottomed. One end of the valve stem has a cone-shaped valve head 152 integral therewith and the other end of the stem is equipped with a threaded portion 154 onto which is threaded a nut 156 having a flange 158 against which abuts one end of a spring 160, the other end of which abuts the bushing 146. The spring 160 normaly urges the valve head 152 against a valve seat 162 to close the passages 140 and 142. The threaded portion 154 of the valve stem protrudes beyond the right end of piston 58 so as to engage a recessed portion 164 of casing 40 when the piston is in its normal position to the right end of the cylinder to unseat the valve head 152 from seat 162. Under normal conditions of operation the pressures acting on opposite sides of valve head 152 are equal and the valve is held onto its seat 162 by spring force only.

Operator operated means is provided for controlling valve 92 and comprises a piston 106 having an axis of reciprocation substantially coincident with the axis of reciprocation of piston 58. Piston 106 is movable relative to piston 58 and has a cirfumferential groove 108 axially disposed between lands 110 and 112. The lands have annuluses 114 and 116 formed therein respectively to receive seals 118. The seal disposed in the annulus 114 divorces groove 108 from chamber 74 and the seal disposed in annulus 116 divorces groove 108 from atmosphere. The piston 106 is bored longitudinally at 120 and radially at 122. A valve seat 123 is formed in the bore 120 where it terminates in one end of the piston 106. The bore 80 and valve head 100 have substantially the same diameters. The radial bore 122 intersects the groove 108 and the bore 120. The circumferential groove 108 is always in communication with the outlet port 50 irrespective of the position of the piston. The piston 106 is recessed at 126 to receive one end of a thrust member 128 which is pivotally fixed at 130 to a foot lever or treadle 132 pivotally fastened at 134 to a vehicle, not shown.

The valve 92, is carried by the piston 58 and is disposed therein so that the valve heads 98 and 100 seat on the valve seats 84 and 123 respectively. The bores 120, 122 and groove 108 form a passage connecting chamber 74 to outlet 50. The bore 80, chamber 82 and groove 62 form a passage connecting the inlet 54 to the chamber 74. Valve 92 is normally seated in the passage connecting the inlet port to chamber 74 and normally unseated in the passage connecting the outlet port 50 to chamber 74.

Figure 3 illustrates a modified embodiment of the device of the invention and comprises a cylinder 200 having an end cover 202 with a flange 204 and a tubular portion 206. The end cover 202 is secured to the cylinder 200 by bolts 208 which pass through openings 210 in the flange and engage interiorly threaded bores 212 of the cylinder. The interior of the cylinder 200 is stepbored at 214 and 216 to accommodate a piston 218 having a minor diameter 220 and a major diameter 222. The piston is normally urged toward one end of the cylinder, the right end as viewed in Figure 3, by a spring 223 which has one of its ends abutting the cylinder and the other end abutting the piston. The piston is provided with a circumferential groove 224 intermediate the two diameters. Annuluses 226 and 228 are located in the minor and major diameters respectively for receiving seals 230 and 232 which separates the cylinder into three chambers 234, 236 and 238, located on the left of the piston, circumferentially thereof and on the right of the piston respectively. Chamber 234 is continuously in communication with the motors 30 of the brake system of Figure 1. A working port 240 opens into chamber 234 and connects that chamber to the motors. The chamber 234 and its connections to the motors 30 form a closed hydraulic system in the same manner as the corresponding parts in Figure 1. Chambers 236 and 238 are normally connected to reservoir through an outlet port 242 disposed in cylinder 200. An inlet 244 is formed in the end cover 202 and connects the accumulator 14 to the chamber 238 at times. The tubular portion 206 of the end cover contains a groove 246 formed between lands 248 and 250 having annuluses 252 and 254 respectively. A sleeve 256 having one end extending into chamber 238 and the other end protruding beyond the tubular portion 206 is arranged to slide on the lands 248 and 250. The annuluses 252 and 254 are formed to have seals 258 placed therein for isolating groove 246 from atmosphere and from chamber 238. A passage 260 in the end cover connects the inlet 244 to the groove 246. Sleeve 256 has a longitudinal passage 262 therein and radially drilled holes 264 and 266 axially spaced in said passage for transmitting fluid from the inlet to a chamber 239. The radial holes 264 are disposed within the sleeve to communicate the longitudinal passage to the inlet irrespective of the position of the slidable sleeve which is slidable relative to the piston 218. The sleeve is operator operated by any suitable means such as the foot treadle 132, shown in Figure 1, having the necessary linkage, not shown, connecting the lever to a thrust member 268.

For controlling the inlet fluid pressure in chamber 238 valve means is provided which is actuated by movement of sleeve 256. This valve means is carried by that portion of the sleeve which extends into one end of the cylinder and comprises a tubular member 270 enveloping the extended portion of the sleeve. The tubular member 270 has an inturned flange 272 which is secured to the sleeve 256 adjacent the radial holes 266. The flange 272 spaces the tubular member radially from the sleeve to thereby provide the chamber 238. An element 273 having a valve seat 274 is carried interiorly of the tubular member 270 and arranged adjacent the end of sleeve 256 for engagement with a valve 276 slidably mounted in the end of sleeve 256 and normally urged toward the seat 274 by a spring 278 to control the inlet fluid pressure from chamber 239 to chamber 238. A passage 280 connects the circumferential groove 224 of piston 218 to a chamber 282 of the piston. A disc-like member 284 is mounted adjacent chamber 282 and forms one wall of the chamber. The disc-like member is provided with a valve seat 286 disposed with respect to the valve 276 to be engaged thereby to control communication between the reservoir and chamber 238. Member 284 has a slight radial displacement with respect to the piston 218. An element 287 is secured to the piston and forms a stop to limit the axial movement of member 284. A seal 289 prevents leakage between the chambers 282 and 238 when valve 276 is seated at 286. With this arrangement of the valve seat 286 valve head 290 of valve 276 tends to seat squarely therein. That is, the seal 289 may be deformed according to the force at the points of contact of valve head 290 on valve seat 286. This is conducive to a substantially uniform seating of the valve head 290 over seat 286. Valve 276 has a conical portion 288 formed therein to engage valve seat 274 and a second conical portion 290 constituted to engage valve seat 286. The sleeve 256 is provided with a diameter D which is greater than diameter D' of the valve head 290 so that when valve 288 is off valve seat 274 the pressure in chamber 238 acts on annulus D—D' urging sleeve 256 to the right. This action or reaction of the pressure in chamber 238 on the end of sleeve 256 provides "feel" for the operator. The "feel" is proportional to the force exerted by the operator. Tubular member 270 is provided with stop elements 292 and 294 axially spaced exteriorly of the member and fixed thereto in a manner to be engaged by washer-like elements 296 and 298 respectively, urged thereagainst by a spring 300. The washer-like element 296 is arranged on the tubular member 270 to engage the piston at 302 to hold the element from axial movement with the tubular member as sleeve 256 is moved to the left as viewed in Figure 3 to thereby compress spring 300. Further movement of the sleeve to the left will seat the valve head 290 on the valve seat 286 and unseat the valve head 288 from valve seat 274. Any further movement of the sleeve member will cause the end of the tubular member to engage the disc-like member 284 to limit the leftward movement of the operator operated means. Radially disposed holes 304 adjacent the end of tubular member 270 permit the free passage of fluid past valve seat 274 when the end of the tubular member in which the holes are located abuts the disc-like member 284.

To compensate for a change in the volume of fluid in the chamber 234 and in the closed part of the system due to temperature variations piston 218 is drilled at 310 and 312 to provide communication between chambers 234 and 238 at times. The drilled passage 312 is interiorly threaded to engage an exteriorly threaded bushing 314 having a drilled passage 316 therein counterbored at 318 and 320 to form a valve seat 322. A ball valve 324 is forced toward seat 322 by a spring 326. A pin 328 is loosely fit into the passage 316 and has one end abutting the ball valve and the other end abutting the end cover 202 to unseat the ball valve when the piston 218 is normally positioned in cylinder 200, as shown in Figure 3.

Since the principle of operation of the mechanisms of Figures 1 and 3 is similar, the operation of Figure 1 only will be described. However, it should be noted that the device in Figure 3 is a booster type hydraulic unit. That is, the pressure at port 240 is greater than the inlet pressure at port 244. This pressure difference at the two ports may be varied as required by changing the ratio of the diameters 220 and 222 of the ends of piston 218.

The operation of the servo-mechanism is as follows: With the parts of the servo-mechanism or power unit in the positions shown in Figure 1 the inlet fluid pressure is acting in groove 62, chamber 82 and on valve head 98. Since bore 80 is of the same diameter on either side of valve head 98, valve 92 is balanced to inlet pressure and is held on seat 84 by the force only of spring 104. Valve 92 is therefore closed to the admission of inlet fluid pressure to chamber 74. Valve 100 of the valve 92 is unseated from seat 123 to communicate chamber 74 to reservoir through the passages 120, 122 and the outlet port 50. Chamber 76 is under the same pressure as chamber 74 since under the above assumed conditions valve head 152 is unseated from seat 162 to establish communication between the chambers. That is, with the piston 58 in its normal position, at one end of the cylinder the threaded portion 154 of valve stem 150 abuts the recessed portion 164 of casing 40 to unseat valve head 152.

To operate the brakes 32, the treadle 132 is depressed, that is, rotated to the left. This moves piston 106 into contact with valve head 100 to seal off chamber 74 to reservoir. Continued rotation of the treadle unseats valve head 98 to admit inlet fluid pressure to chamber 74 to move piston 58 to the left, toward the other end of the cylinder. Movement of piston 58 to the left displaces the fluid in chamber 76 which is connected to the motors 30 through the working port 52 and pipes 26 and 28. Because of the equal areas of the ends of piston 58 the pressure in chamber 76 will be made substantially equal to the pressure in chamber 74 minus the force of loading spring 60 neglecting friction. The pressure in chamber 74 acting to move piston 58 to the left is also effective on the left end of the piston 106 tending to move it to the right against the force applied to the treadle by the operator. Manifestly this treadle pressure is going to vary directly with the fluid pressure acting in motors 30. This relationship of treadle pressure to fluid motor pressure may be varied by changing the area of piston 106. It will be noted that unseating valve head 98 to admit fluid under pressure to chamber 74 moved piston 58 in a direction to reseat valve head 98 to cut off fluid pressure to the chamber 74. So long as the treadle pressure is equal to the sum of the combined hydraulic reaction acting on the end of piston 106 and the load of spring 104, the pressure in the chambers will remain substantially unchanged. If the treadle pressure is in excess of the hydraulic reaction and the load of spring 104, the piston 58 will continue to move leftward until the pressure in chambers 74 and 76 are equal to the accumulator pressure of the system. A decrease in the treadle pressure below the hydraulic reaction and load of spring 104 will unseat valve head 100 to connect chamber 74 to reservoir to reduce the pressure in chambers 74 and 76.

Since the pressures existing on both sides of piston 58 in chambers 74 and 76 are substantially the same under normal operating conditions, it follows that the pressures acting across the head 152 when it is seated on valve seat 162 are likewise substantially equal. This normal balanced condition across head 152 coupled with the proper arrangement of the valve head in the piston provides an emergency valve which may be operated in the event of any loss of fluid in chamber 76 to admit accumulator pressure directly to the motors. That is, the loss of fluid in chamber 76 will cause an unbalanced pressure in chambers 74 and 76, with the greater pressure in chamber 74 acting to unseat the valve head 152 against spring 160 to admit fluid to chamber 76 and to the motors 30.

If for any reason the hydraulic power should fail, the brake system may be put under pressure by an operator. That is, with the hydraulic power cut off depressing treadle 132 transmits a force through piston 106 and valve 92 to piston 58 to thereby move the latter in a direction to put the fluid in chamber 76 under pressure.

I claim:

1. A fluid power unit comprising a cylinder, a piston in the cylinder dividing the same into opposed chambers and normally urged to one end of the cylinder, the chamber in the other end of the cylinder being formed to receive the piston to thereby put fluid in said chamber under pressure, an inlet port in the cylinder, an outlet port in the cylinder normally in communication with said one end of the cylinder, a working port in the cylinder in continuous communication with the other end of the cylinder, a passage in the piston connecting the outlet port to said one end of the cylinder, operator operated means slidably disposed in said one end of the cylinder and including a sleeve member having a portion extending into said one end of the cylinder and a portion protruding exteriorly of said cylinder, a passage through said sleeve for communicating said one end of the cylinder with the inlet port, valve means for controlling communication between said inlet and outlet ports and said one end of the cylinder and including a valve seat in each passage, a valve member carried by that portion of said sleeve extending into said one end of the cylinder and having one end formed to engage the valve seat in the passage of said sleeve to thereby cut off communication between said inlet and said one end of the cylinder and the other end of said valve member being formed to engage the valve seat in the passage of said piston, a spring normally urging said valve member onto the valve seat in the passage of said sleeve, and means supported by said sleeve for urging the same in a direction to unseat said other end of the valve member from the seat in the passage of said piston to thereby communicate said outlet port with said one end of the cylinder, said valve member being formed so that equal effective areas are exposed to the outlet port and to the inlet port at all times regardless of the position of said valve member.

2. A fluid power unit comprising a cylinder, a piston in the cylinder dividing the same into opposed chambers and normally urged to one end of the cylinder, the chamber in the other end of the cylinder being formed to receive the piston to thereby put fluid in said chamber under pressure, an inlet port in the cylinder, an outlet port in the cylinder normally in communication with said one end of the cylinder, a working port in the cylinder in continuous communication with the other end of the cylinder, a passage in the piston connecting the outlet port to said one end of the cylinder, operator operated means slidably disposed in said one end of the cylinder and including a sleeve member having a portion extending into said one end of the cylinder and a portion protruding exteriorly of said cylinder, a passage through said sleeve for communicating said one end of the cylinder with the inlet port, valve means for controlling communication between said inlet and outlet ports and said one end of the cylinder and including a valve seat in each passage, a valve member carried by that portion of said sleeve extending into said one end of the cylinder and having one end formed to engage the valve seat in the passage of said sleeve to thereby cut off communication between said inlet and said one end of the cylinder and the other end of said valve member being formed to engage the valve seat in the passage of said piston, a spring normally urging said valve member onto the valve seat in the passage of said sleeve, and a spring interposed between said piston and sleeve for urging the same in a direction to unseat said other end of the valve member from the seat in the passage of said piston to thereby communicate said outlet port with said one end of the cylinder, said valve member being formed so that equal effective areas are exposed to the outlet port and to the inlet port at all times regardless of the position of said valve member, the end of said sleeve extending into said one end of said cylinder having an effective area such that when said valve member is seated in the passage of said piston and unseated in the passage of said sleeve the pressure in said one end of the cylinder acts on said effective area of the sleeve to thereby urge the same in a direction opposing movement of said sleeve by the operator and with a force proportional to the operator's applied force.

3. A device as claimed in claim 2, wherein a valve device is carried by the piston to be operated when said piston is at said one end of the cylinder to establish communication between said one end and the other end of the cylinder to compensate for change in volume of fluid in said other end of the cylinder due to temperature variations of the fluid.

GEORGE W. PONTIUS, III.

REFERENCES CITED

The following references are of record in the file of this patent:

UNITED STATES PATENTS

| Number | Name | Date |
| --- | --- | --- |
| 1,604,545 | Bragg | Oct. 26, 1926 |
| 1,831,737 | Broussouse | Nov. 10, 1931 |
| 1,938,979 | Sawtelle | Dec. 12, 1933 |
| 1,991,902 | Lloyd | Feb. 19, 1935 |
| 2,185,449 | Veenschoten | Jan. 2, 1940 |
| 2,266,504 | Main | Dec. 16, 1941 |
| 2,318,756 | Chouings | May 11, 1943 |
| 2,385,942 | Rockwell | Oct. 2, 1945 |
| 2,413,380 | Rush | Dec. 31, 1946 |

FOREIGN PATENTS

| Number | Country | Date |
| --- | --- | --- |
| 384,678 | Great Britain | Dec. 9, 1932 |
| 549,300 | Great Britain | Nov. 16, 1942 |
| 747,273 | France | Mar. 28, 1933 |